United States Patent
Chen et al.

(10) Patent No.: US 11,796,862 B1
(45) Date of Patent: Oct. 24, 2023

(54) BACKLIGHT MODULE, METHOD FOR ASSEMBLING BACKLIGHT MODULE, AND DISPLAY DEVICE

(71) Applicant: HKC CORPORATION LIMITED, Shenzhen (CN)

(72) Inventors: Qinglin Chen, Shenzhen (CN); Baohong Kang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/207,683

(22) Filed: Jun. 9, 2023

(51) Int. Cl.
*G02F 1/00* (2006.01)
*G02F 1/13357* (2006.01)

(52) U.S. Cl.
CPC .. *G02F 1/133608* (2013.01); *G02F 1/133606* (2013.01)

(58) Field of Classification Search
None
See application file for complete search history.

(56) References Cited

U.S. PATENT DOCUMENTS

| | | | |
|---|---|---|---|
| 2016/0291242 A1* | 10/2016 | An | G02B 6/0073 |
| 2016/0291388 A1* | 10/2016 | An | G02F 1/133308 |
| 2018/0184534 A1* | 6/2018 | Na | H05K 5/0234 |
| 2019/0129090 A1* | 5/2019 | Ying | G02B 6/0081 |
| 2020/0041832 A1* | 2/2020 | Hsu | G02F 1/133308 |
| 2020/0355957 A1* | 11/2020 | Cheng | G02F 1/133314 |
| 2022/0155637 A1* | 5/2022 | Du | G02F 1/133603 |
| 2022/0236604 A1* | 7/2022 | Dong | G02F 1/133317 |

FOREIGN PATENT DOCUMENTS

| | | |
|---|---|---|
| CN | 103206652 A | 7/2013 |
| CN | 205229631 U | 5/2016 |
| CN | 206594421 U | 10/2017 |
| CN | 109613755 A | 4/2019 |
| CN | 215117091 U | 12/2021 |
| WO | 2013002117 A1 | 1/2013 |

* cited by examiner

Primary Examiner — Gerald J Sufleta, II

(57) ABSTRACT

A backlight module, a method of assembling a backlight module, and a display device are disclosed. The backlight module includes a backboard, a fixing seat, a movable piece, a securing bracket, and an optical film. The fixing seat is fixed to a bottom of the backboard. The movable piece is made of a metal material and is correspondingly arranged on the fixing seat. The securing bracket includes an insert piece and an attraction piece that are connected together. The insert piece is fixed to a side of the backboard. The attraction piece is arranged opposite to the movable piece and is made of a magnetic material. The optical film is disposed between the movable piece and the attraction piece.

19 Claims, 7 Drawing Sheets

BACKLIGHT MODULE, METHOD FOR ASSEMBLING BACKLIGHT MODULE, AND DISPLAY DEVICE

CROSS-REFERENCE TO RELATED APPLICATIONS

This application claims the priority and benefit of Chinese patent application 2022111982111, titled "Backlight Module, Method for Assembling Backlight Module, and Display Device" and filed Sep. 29, 2022 with China National Intellectual Property Administration, the entire contents of which are incorporated herein by reference.

TECHNICAL FIELD

The present application relates to the field of display technology, and more particularly relates to a backlight module, a method of assembling the backlight module, and a display device.

BACKGROUND

Nowadays, with the improvement of people's living standards, various electronic necessities are becoming more and more popular, among which liquid crystal displays are used in various fields such as offices, scientific research and vehicles. A liquid crystal display mainly includes a backlight module and a display panel. The display panel itself does not emit light, and it mainly displays images through the display light source provided by the backlight module.

The visual effects, quality, and functions of electronic products containing liquid crystal displays are mostly influenced by the components assembly capabilities. For the time being, in the liquid crystal display industry, the optical film of the backlight module is mostly fixed by pressing or bonding. However, due to the problem of thermal expansion and contraction of the optical film, after the optical film is fixed, there is the problem of warping of the optical film when it is heated and expanded, and the problem of loosening of the optical film when the optical film is contracted by cold, which will affect the product quality.

SUMMARY

In view of the above, it is a purpose of this application to provide a backlight module, a method of assembling the backlight module, and a display device, so as to avoid warping and loosening of the optical film caused by thermal expansion and contraction after being fixed.

The application discloses a backlight module, which includes a backboard, a fixing seat, a movable piece, a securing bracket and an optical film. The backboard includes a bottom plate and a side plate. The side plate is connected to the edge of the bottom plate, and together with the bottom plate forms an receiving space. The fixing seat is arranged in the receiving space and fixed onto the bottom plate. The movable piece is made of a metal material, is disposed opposite to the bottom plate, and is correspondingly arranged on the fixing seat. The securing bracket includes an insert piece and an attraction piece that are connected together. The insert piece is fixed onto the side plate. The attraction piece is arranged opposite to the movable piece, and the attraction piece is made of a magnetic material. The optical film is arranged in the receiving space, and is located between the movable piece and the attraction piece. The movable piece and the attraction piece are arranged corresponding to the edge of the optical film.

When the securing bracket is not installed on the side plate, the movable piece is arranged on the fixing seat, and the optical film is stacked on the movable piece. When the securing bracket is installed on the side plate, the attraction piece attracts the movable piece, and cooperates with the movable piece to clamp and secure the optical film.

In some embodiments, the fixing seat includes a fixing column, and the fixing column is fixed onto the bottom plate. The end of the fixing column away from the bottom plate is provided with a pin, and the cross-sectional area of the pin is smaller than that of the fixing column. The movable piece is provided with a through hole, and the movable piece is slidably connected with the pin through the through hole.

In some embodiments, the fixing seat is block-shaped. The side of the fixing seat facing the optical film is provided with a mounting groove. The movable piece is slidably fitted with the mounting groove, and slides up and down along the depth direction of the mounting groove.

In some embodiments, the fixing seat includes a telescopic rod. The telescopic rod extends and retracts in a direction perpendicular to the bottom plate, and one end of the telescopic rod is fixed onto the bottom plate, and the other end is fixedly connected to the movable piece. When the securing bracket is not installed on the side plate, the telescopic rod is in a retracted state. When the securing bracket is installed on the side plate, the telescopic rod is in an extended state.

In some embodiments, the side plate is provided with a limiting groove opposite to the fixing seat. The shape of the limiting slot corresponds to the shape of the insert piece, and a screw hole is provided in the limiting slot. An expansion screw corresponding to the screw hole is provided on the side of the insert piece away from the fixing seat. When the insert piece is inserted into the limiting slot, the expansion screw is fixedly fitted with the screw hole. Alternatively, the side plate is provided with a slideway opposite to the fixing seat, a horizontal section of the slideway is C-shaped, and the insert piece is inserted into the slideway to be fixedly connected with the side plate.

In some embodiments, at least two sides of the backboard are each provided with at least two of the fixing seats, at least two of the movable pieces and at least two of the securing brackets. The at least two fixing seats, at least two movable pieces and at least two securing brackets are provided in one-to-one correspondence.

In some embodiments, the side of the optical film is provided with a hanging lug protruding outward along the horizontal direction. An orthographic projection of the hanging lug on the bottom plate overlaps or coincides with the orthographic projection of the movable piece on the bottom plate.

In some embodiments, the movable piece and the attraction piece are grid-shaped.

The present application further discloses a method of assembling a backlight module, which is used to assemble the above-mentioned backlight module, and the method includes the following operations:

mounting the movable piece on the fixing seat;
putting the optical film into the receiving space of the backboard, and stacking it on the movable piece; and
fixing the inserting piece of the securing bracket on the side plate of the backboard, and disposing the attraction piece in the securing bracket opposite to the movable piece;

when the insert piece is fixed onto the side plate, the attraction piece attracts the movable piece and the optical film, and cooperates with the movable piece to clamp and secure the optical film.

The present application further discloses a display device, which includes a display panel and the above-mentioned backlight module, where the backlight module provides backlight for the display panel.

Compared with the method of fixing the optical film by pressing or bonding, this application clamps and fixes the optical film through the magnetic attraction force between the securing bracket and the movable piece. After the securing bracket is installed and fixed onto the side plate, the optical film is attracted and fixed upwards by the movable piece, so that the optical film is only pushed upward by the movable piece, but will not be pressed tightly. In this way, when the optical film is heated and expanded, the optical film can push the movable piece away downwards, without concentrating the force on the middle region of the optical film causing the optical film to warp and affecting the optical quality. When the optical film is cooled and shrunk, the movable piece can move upwards with the contraction of the optical film, and continue to abut against the optical film, so that the optical film will not be loosened, thus effectively guaranteeing the quality of the product.

BRIEF DESCRIPTION OF DRAWINGS

The accompanying drawings are used to provide a further understanding of the embodiments according to the present application, and constitute a part of the specification. They are used to illustrate the embodiments according to the present application, and explain the principle of the present application in conjunction with the text description. Apparently, the drawings in the following description merely represent some embodiments of the present disclosure, and for those having ordinary skill in the art, other drawings may also be obtained based on these drawings without investing creative efforts. A brief description of the accompanying drawings is provided as follows.

Figure 1:
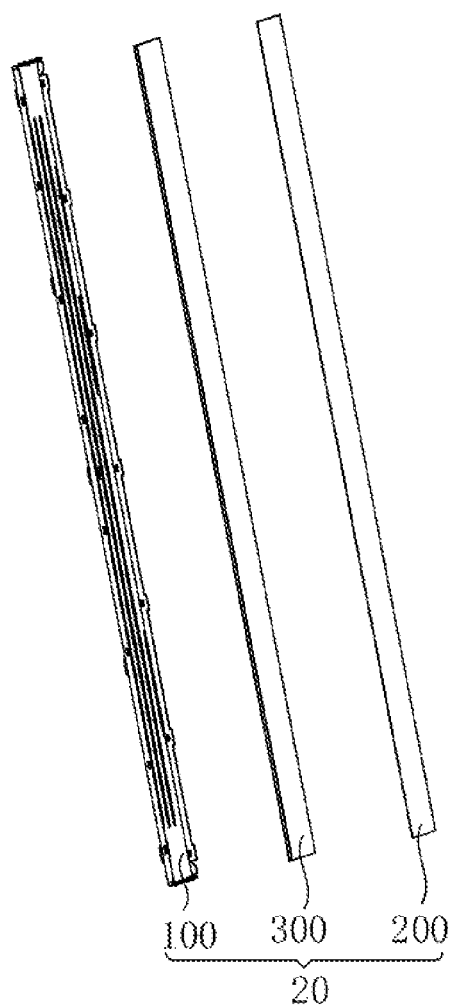
FIG. 1 is an exploded schematic diagram of a backlight module provided by an embodiment according to the present application.

In the drawings: 10, display device; 20, backlight module; 30, display panel; 100, backboard; 110, bottom plate; 120, side plate; 121, limit slot; 122, screw hole; 123, slideway; 130, fixing seat; 131, fixing column; 132, pin; 133, mounting groove; 134, telescopic rod; 140, movable piece; 141, through hole; 150, securing bracket; 151, insert piece; 152, attraction piece; 153, expansion screw; 200, optical film; 210, hanging lug; 300, light guide plate.

DETAILED DESCRIPTION OF EMBODIMENTS

It should be understood that the terms used herein, the specific structures and function details disclosed herein are intended for the mere purposes of describing specific embodiments and are representative. However, this application may be implemented in many alternative forms and should not be construed as being limited to the embodiments set forth herein.

As used herein, terms "first", "second", or the like are merely used for illustrative purposes, and shall not be construed as indicating relative importance or implicitly indicating the number of technical features specified. In addition, terms "center", "transverse", "up", "down", "left", "right", "vertical", "horizontal", "top", "bottom", "inside", "outside", or the like are used to indicate orientational or relative positional relationships based on those illustrated in the drawings. They are merely intended for simplifying the description of the present disclosure, rather than indicating or implying that the device or element referred to must have a particular orientation or be constructed and operate in a particular orientation. Therefore, these terms are not to be construed as restricting the present disclosure.

Hereinafter this application will be described in further detail with reference to the accompanying drawings and some optional embodiments.

Figure 2:
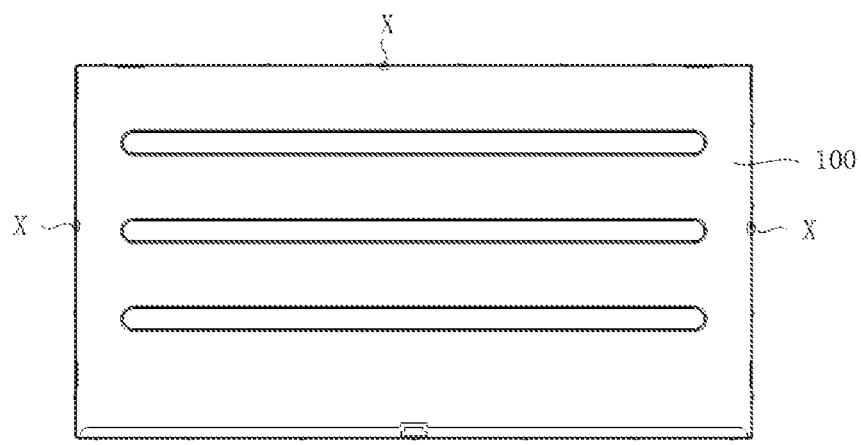
FIG. 2 is a schematic plan view of a backlight module provided by an embodiment according to the present application.
Figure 3A:
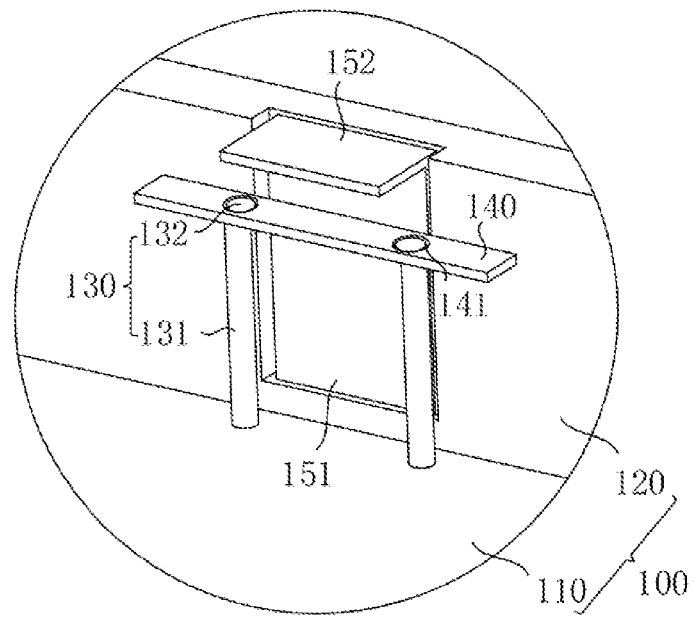
FIG. 3a is a schematic diagram illustrating a connection between a first movable piece and a fixing seat provided by an embodiment according to the present application.

As shown in FIG. 1, FIG. 2 and FIG. 3a, the present application discloses a backlight module 20. The backlight module 20 includes a backboard 100, a light source assembly and an optical film 200. The backboard 100 includes a bottom plate 110 and a side plate 120. The side plate 120 is connected to an edge of the bottom panel 110 to form a receiving space together with the bottom panel 110. The light source assembly and the optical film 200 are located in the receiving space.

The backlight module 20 may adopt a direct-lit backlight, or an edge-lit backlight. When a direct-lit backlight is used, the light source assembly is a direct-lit light plate assembly fixed onto the bottom plate 110. The backlight module 20 further includes a diffusion plate, and the optical film 200 and the diffusion plate are sequentially stacked on the light source assembly. When the edge-lit backlight is used, the light source assembly is an edge-lit light plate assembly, which is fixed onto the side plate 120. The backlight module 20 further includes a light guide plate 300. The light guide plate 300 is arranged side by side with the light source assembly, and the optical film 200 is arranged on the light guide plate 300.

The backlight module 20 further includes a fixing seat 130, a movable piece 140 and a securing bracket 150. The fixing seat 130 is arranged in the receiving space, is fixed onto the bottom plate 110, and is arranged side by side with the light source assembly, the light guide plate or the diffusion plate. The movable piece 140 is made of a metal material, is arranged opposite to the bottom plate 110, is arranged horizontally, and is correspondingly arranged on the fixing seat 130, and can move in an orientation perpendicular to the bottom plate 110. In the backlight module 20, the fixing seat 130 has a position-limiting effect on the movable piece 140, preventing the movable piece 140 from shifting which may otherwise make it impossible to continue the assembly when shaking occurs during the installation of the backlight module 20. Furthermore, the fixing seat 130 can also increase the height of the movable piece 140 to prevent the distance between the movable piece 140 and the top of the securing bracket 150 from getting too far thus resulting in weakened attraction and making it difficult to attract the movable piece 140 and the optical film 200.

The securing bracket 150 includes an insert piece 151 and an attraction piece 152 that are connected together. The insert piece 151 is fixed onto the side plate 120. The attraction piece 152 is arranged opposite to the movable piece 140, and the attraction piece 152 is made of a magnetic material. Since the backboard 100 may be made of a metal material, this embodiment according to the present application sets the attraction piece 152 as a magnetic material and the movable piece 140 as a metal material, so as to avoid the creation of a magnetic attraction between the movable piece 140 and the backboard 100 which may otherwise weaken the attraction force between the movable piece 140 and the attraction piece 152.

Furthermore, in the securing bracket 150, only the attraction piece 152 is made of a magnetic material, which can be a magnet or other magnetic materials. The insert piece 151 does not contain magnetism, and can be made of a metal material or a plastic, so as to avoid the problem of difficulty of installation or affecting the movable piece 140 due to magnetism during the process of fixing the insert piece 151 to the side plate 120. When the insert piece 151 is made of a metal material, the entire securing bracket 150 can be integrally formed, and the magnetic attraction piece 152 can be formed by magnetically processing the top portion of the securing bracket 150. When the insert piece 151 is made of a plastic material, a magnet block can be fixed onto the insert piece 151 by means of screws, injection molding, clamping, insertion, etc. to form the attraction piece 152.

Further, the optical film 200 is arranged in the receiving space, and is located between the movable piece 140 and the attraction piece 152. The movable piece 140 and the attraction piece 152 are each arranged corresponding to the edge of the optical film 200. When the securing bracket 150 is not installed on the side plate 120, the movable piece 140 is arranged on the fixing seat 130, and the optical film 200 is stacked on the movable piece 140. When the securing bracket 150 is installed on the side plate 120, the attraction piece 152 attracts the movable piece 140, and cooperates with the movable piece 140 to clamp and secure the optical film 200.

Compared with the method of fixing the optical film 200 by pressing or bonding, this application clamps and secures the optical film 200 through the magnetic attraction force between the securing bracket 150 and the movable piece 140. After the securing bracket 150 is installed and fixed onto the side plate 120, the optical film 200 is attracted and secured upwards by the movable piece 140, so that the optical film 200 is only pushed upward by the movable piece 140, but will not be pressed tightly. In this way, when the optical film 200 is heated and expanded, the optical film 200 can push the movable piece 140 away downwards, without concentrating the force on the middle region of the optical film 200 causing the optical film 200 to warp and affecting the optical quality. When the optical film 200 is cooled and shrunk, the movable piece 140 can move upwards with the contraction of the optical film 200, and continue to abut against the optical film 200, so that the optical film 200 will not be loosened, thus effectively guaranteeing the quality of the product.

Furthermore, this magnetic fixing method does not require glue or adhesive, so it will not cause light leakage problems. In addition, after the optical film 200 is secured by the movable piece 140 and the securing bracket 150, the bottom of the movable piece 140 is not subjected to additional supporting force, which avoids the risk of impact caused by the vibration of the structure at the bottom of the movable piece 140.

Furthermore, the backlight module 20 is further provided with a sealant. The sealant is fixed onto the backboard 100, and the sealant is designed to avoid the space corresponding to the position of the securing bracket 150. Compared with fixing the securing bracket 150 on the sealant, since the backboard 100 is thicker and stronger, it not only facilitates processing, but also ensures the stability of the securing bracket 150 after fixing.

In an embodiment according to the present application, a set of fixing seat 130, movable piece 140 and securing bracket 150 is used as the fixing structure of an optical film 200. The width of the fixing structure can be greater than one-third of the length of the side plate 120. That is, the length of the movable piece 140 and the securing bracket 150 is greater than one-third of the length of the side plate 120. In this case, the fixing structure is a strip-shaped fixing for the optical film 200. The width of the fixed structure can also be less than one-tenth of the length of the side plate 120. That is, the length of the movable piece 140 and the securing bracket 150 is less than one-tenth of the length of the side plate 120. In this case, the fixing structure is point-shaped fixing for the optical film 200; as shown in FIG. 2, the fixing structure is represented by X in this case. Furthermore, the fixing structure can also be arranged on one side of the backboard 100, or on two sides, three sides or four sides of the backboard 100, and even one or more fixing structures can be made on each side of the backboard 100. These can be designed according to actual needs.

As one of the possible solutions, at least two sides of the backboard 100 are each provided with at least two of the fixing seats 130, at least two of the movable pieces 140 and at least two of the securing brackets 150. The at least two of the fixing seats 130, at least two of the movable pieces 140 and at least two of the securing brackets 150 are arranged in one-to-one correspondence. While reducing the stress on the optical film 200, the stability of the optical film 200 is improved.

In addition, regarding the flexible connection methods of the movable piece 140, the embodiments of the present application provide the following three implementations, but it should be noted that the flexible connection methods of the movable piece 140 are not limited to these three, as long as the movable piece 140 can be moved up and down.

As shown in FIG. 3a, as a first implementation, the fixing seat 130 adopts a columnar structure. Specifically, the fixing seat 130 includes a fixing column 131, and the fixing column 131 is fixed onto the bottom plate 110. The end of the fixing column 131 away from the bottom plate 110 is provided with a pin 132, the cross-sectional area of the pin 132 is smaller than that of the fixing column 131. The movable piece 140 is provided with a through hole 141, and the movable piece 140 is slidably connected with the pin 132 through the through hole 141. That is, the cross-sectional area of the through hole 141 is larger than the cross-sectional area of the pin post 132 and smaller than the cross-sectional area of the fixing column 131. When the securing bracket 150 is not installed on the side plate 120, the pins 132 are inserted into the through holes 141 one by one, so that the movable piece 140 is movably connected with the fixing column 131.

In this embodiment, the cross sections of the fixing columns 131, the pin posts 132 and the through holes 141 may be circular, square or other irregular shapes, which are not limited herein. When the movable piece 140 is installed on the fixing seat 130, the top of the pin 132 does not protrude from the top of the movable piece 140. That is, the height of the pin 132 is smaller than the thickness of the movable piece, so as to prevent the optical film 200 from being lifted up by the pin when the optical film 200 is placed causing the optical film 200 to be uneven. When the securing bracket 150 is installed on the side plate 120, the movable piece 140 moves upward along the extending direction of the pin 132 until the optical film 200 is pushed against the attraction piece 152.

The movable piece 140 can be provided with a through hole 141, and can also be provided with two through holes 141 or even more through holes 141. Correspondingly, the fixing seat 130 can also be composed of one fixing column 131, or two fixing columns 131 or even more fixing columns 131. The pin post 132 on each fixed post 131 is dispsoed corresponding to a respective through hole 141 in the movable piece 140. When there is only one through hole 141 in the movable piece 140, the through hole 141 is located at the center of the movable piece 140. When there are only two through holes 141 in the movable piece 140, the two through holes 141 are located at two ends of the movable piece 140 respectively. When there are more than three through holes 141 in the movable piece 140, the more than three through holes 141 are arranged side by side and evenly distributed on the movable piece 140, thereby ensuring the stability between the movable piece 140 and the fixing columns 131.

Figure 3B:
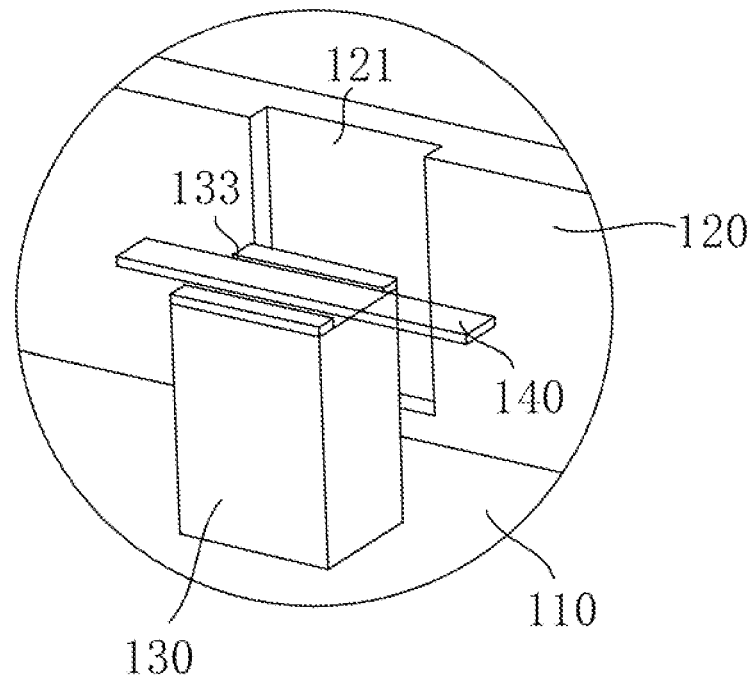
FIG. 3b is a schematic diagram illustrating a connection between a second movable piece and the fixing seat provided by an embodiment according to the present application.

As shown in FIG. 3b, as a second implementation, the fixing seat 130 is block-shaped. Specifically, the fixing seat 130 is provided with a mounting groove 133 in the side facing the optical film 200. The movable piece 140 is slidably fitted with the mounting groove 133, and slides up and down along the depth direction of the mounting groove 133. When the securing bracket 150 is not installed on the side plate 120, the movable piece 140 is disposed in the mounting groove 133, so that the movable piece 140 is movably connected with the fixing seat 130.

In this embodiment, the length of the mounting groove 133 may be shorter than the length of the fixing seat 130, and in this case, the mounting groove 133 does not pass through the fixing seat 130 in the horizontal direction. The length of the mounting groove 133 can also be equal to the length of the fixing seat 130. In this case, the mounting groove 133 runs through the fixing seat 130 in the horizontal direction, so that even if the volume of the fixing seat 130 is small, it can be matched with a relatively long movable piece 140 to meet more usage requirements.

When the securing bracket 150 is installed on the side plate 120, the movable piece 140 moves upwards along the height direction of the mounting groove 133 until the optical film 200 is pushed against the attraction piece 152. Of course, it is also possible that the fixing seat 130 is provided with a protrusion on the side facing the optical film 200, and the movable piece 140 is provided with a limiting hole to cooperate with the protrusion. In this case, when the securing bracket 150 is installed on the side plate 120, the movable piece 140 moves upwards along the height direction of the protrusion until the optical film 200 is pressed against the attraction piece 152.

In the first implementation and the second implementation corresponding to FIG. 3a and FIG. 3b respectively, the fixing seat 130 can be formed integrally with the backboard 100 directly, or can be fixed onto the bottom plate 110 by bonding, welding or screwing.

Figure 3C:
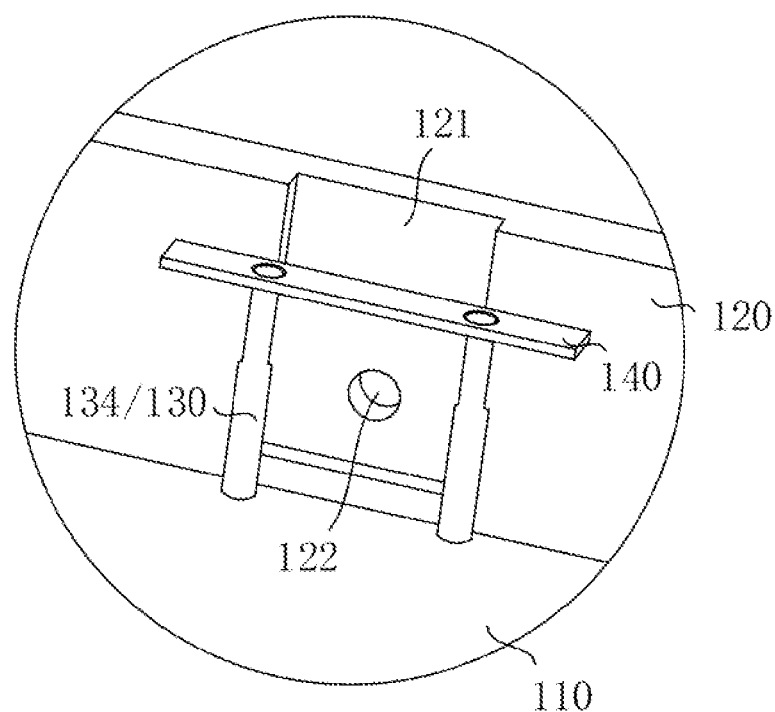
FIG. 3c is a schematic diagram illustrating a connection between a third movable piece and the fixing seat provided by an embodiment according to the present application.

As shown in FIG. 3c, as a third implementation, the fixing seat 130 is scalable and can move up and down together with the movable piece 140. Specifically, the fixing seat 130 includes a telescopic rod 134. The telescopic rod 134 extends and retracts in a direction perpendicular to the bottom plate 110, and one end of the telescopic rod 134 is fixed onto the bottom plate 110, and the other end is fixedly connected to the movable piece 140. When the securing bracket 150 is not installed on the side plate 120, the telescopic rod 134 is in a retracted state. When the securing bracket 150 is installed on the side plate 120, the telescopic rod 134 is in an extended state.

In this embodiment, the telescopic rod 134 may adopt a relatively loose and small-sized telescopic piece. One end of the telescopic rod 134 is directly fixed onto the backboard 100 by means of welding, bonding, etc., and the other end is fixedly connected with the movable piece 140 by means of threaded fit, bonding, etc. After the movable piece 140 is moved by means of the telescopic rod 134, the telescopic rod 134 can limit the moving direction of the movable piece 140, so that the movable piece 140 can only move up and down, thereby avoiding the problems of the movable piece 140 falling off and shifting. As for the number and arrangement of the telescopic rods 134, reference may be made to the design of the above-mentioned fixing columns 131.

For the connection method of the securing bracket 150, the embodiments of the present application provide the following two implementations, but it should be noted that the connection method of the securing bracket 150 in the embodiment of the application is not limited to these two, as long as the insert piece 151 can be fixed.

Figure 4:
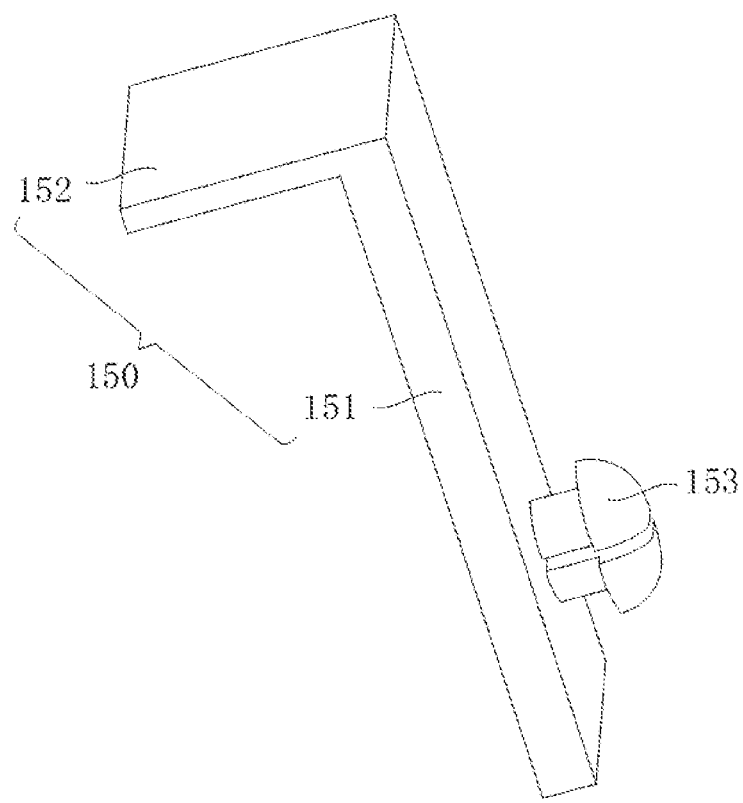
FIG. 4 is a schematic diagram of a securing bracket provided by an embodiment according to the present application.
Figure 5A:
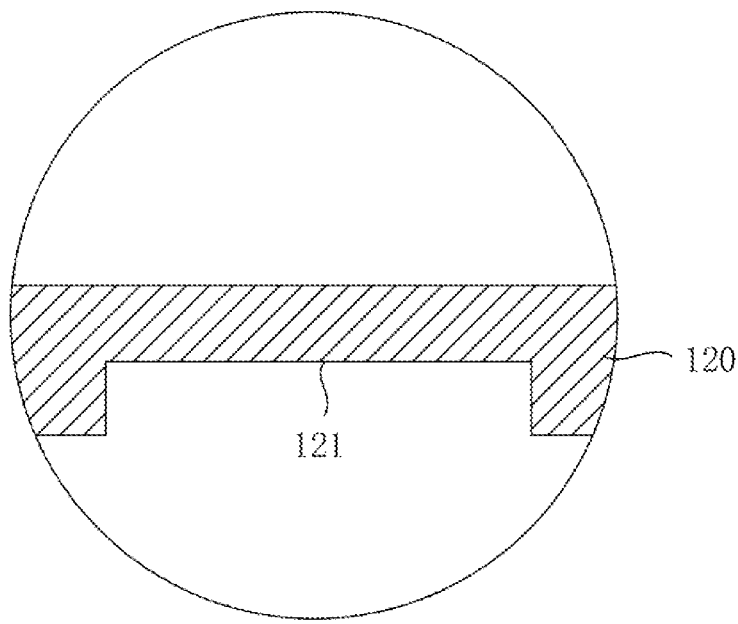
FIG. 5a is a partial schematic diagram of a side plate provided by an embodiment according to the present application.

As shown in FIG. 3a, FIG. 4 and FIG. 5a, as the first implementation of the connection of the securing bracket 150 in the embodiment according to the present application, the side plate 120 is provided with a limiting groove 121 opposite to the fixing seat 130. The shape of the limiting groove 121 corresponds to the shape of the insert piece 151. When the cross-section of the insert piece 151 in the vertical direction is a rectangle, an inverted triangle and an inverted trapezoid, the cross-section of the limiting groove 121 in the vertical direction is also a corresponding rectangle, an inverted triangle and an inverted trapezoid. The insert piece 151 is inserted into the limiting groove 121 along the sidewall of the limiting groove 121.

A screw hole 122 is defined in the limiting groove 121. An expansion screw 153 corresponding to the screw hole 122 is arranged on the side of the insert piece 151 away from the fixing seat 130. When the insert piece 151 is inserted into the limiting slot 121, the expansion screw 153 is fixedly fitted with the screw hole 122. After the insert piece 151 is fixed, the limit groove 121 limits the horizontal direction of the insert piece 151, the screw hole 122 limits the vertical direction of the insert piece 151, and the expansion screw 153 also prevents the inserting piece 151 from falling off from the limiting groove 121, so that the inserting piece 151 is firmly secured thus ensuring the stability of the optical film 200.

Figure 5B:
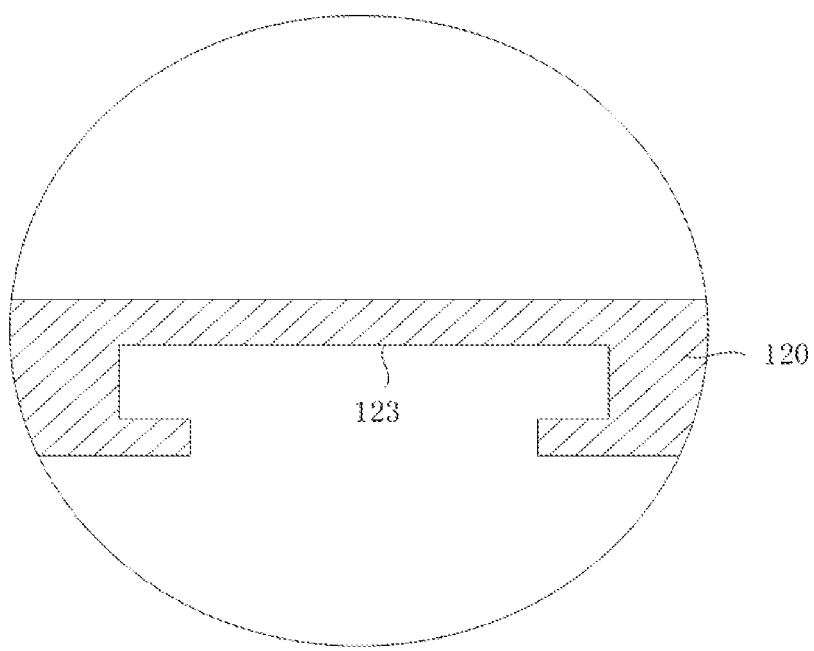
FIG. 5b is a partial schematic diagram of another side plate provided by an embodiment according to the present application.

As shown in FIG. 5b, as the second implementation of the connection of the securing bracket 150 in the embodiment according to the present application, only the slideway 123 opposite to the fixing seat 130 is provided in the side plate 120. The horizontal section of the slideway 123 is C-shaped. The insert piece 151 is inserted into the slideway 123. The outer side of the slideway 123 clamps the insert piece 151, so that the insert piece 151 will not move in the horizontal direction, nor will it fall off, and so the insert piece 151 is fixedly connected with the side plate 120, which can also ensure the stability of the optical film 200.

At present, the fixing method of the optical film 200 also adopts the methods of the ground side hanging lug 210 and the side local protrusion. These methods will obstruct the light passing through the optical film 200, so that undesirable problems such as dark shadows may appear. The embodiments of the present application further provide three specific implementations to solve the shadow problem caused by fixing the optical film 200.

Figure 6:
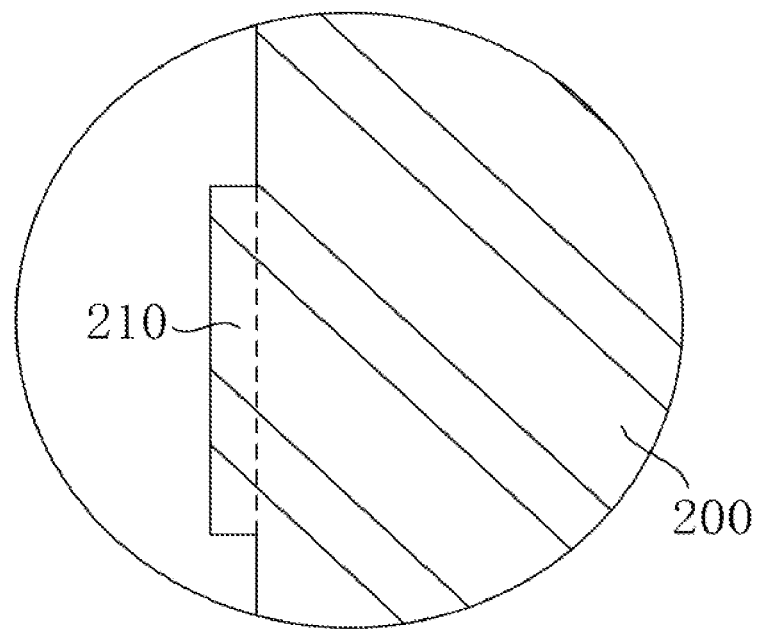
FIG. 6 is a schematic diagram of an optical film provided by an embodiment according to the present application.

As shown in FIG. 6, as the first implementation, the embodiments of the present application further improve the optical film 200, and the side of the optical film 200 is provided with a hanging lug 210 protruding outward in the horizontal direction, and the orthographic projection of the hanging lug 210 on the bottom plate 110 overlaps or coincides with the orthographic projection of the movable piece 140 on the bottom plate 110. The hanging lug 210, the attraction piece 152 and the movable piece 140 are all located outside the light guide plate or the diffusion plate, not in the display region of the display panel, so that the shadow problem caused by light blockage will not be caused.

As a second implementation, the embodiments of the present application directly install an optical film 200 larger in size than the light guide plate or the diffusion plate in the backlight module 20, so that the edge of the optical film 200 protrudes from the light guide plate or the diffusion plate. Then, the fixing seat 130 and the movable piece 140 are arranged at the bottom of the edge of the optical film 200 so that the attraction piece 152 and the movable piece 140 are not within the display region of the display panel.

As a third implementation, in the embodiment according to the present application, the movable piece 140 and the attraction piece 152 are made into a grid shape, which can greatly reduce the light-blocking area of the optical film 200, so that the shadow problem can be improved to a certain extent.

Figure 7A:
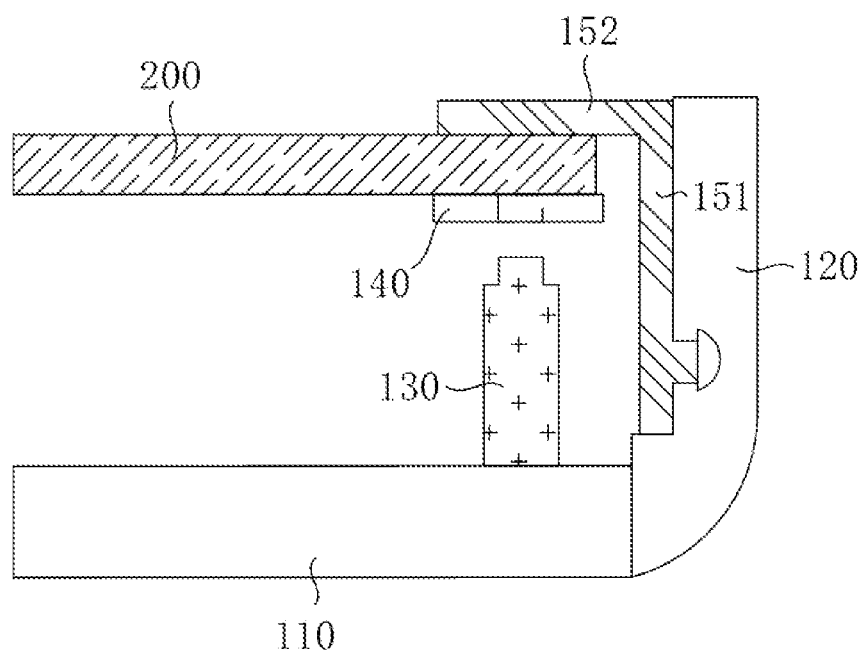
FIG. 7a is a schematic cross-sectional view of a backlight module before assembly of a securing bracket provided by an embodiment according to the present application.
Figure 7B:
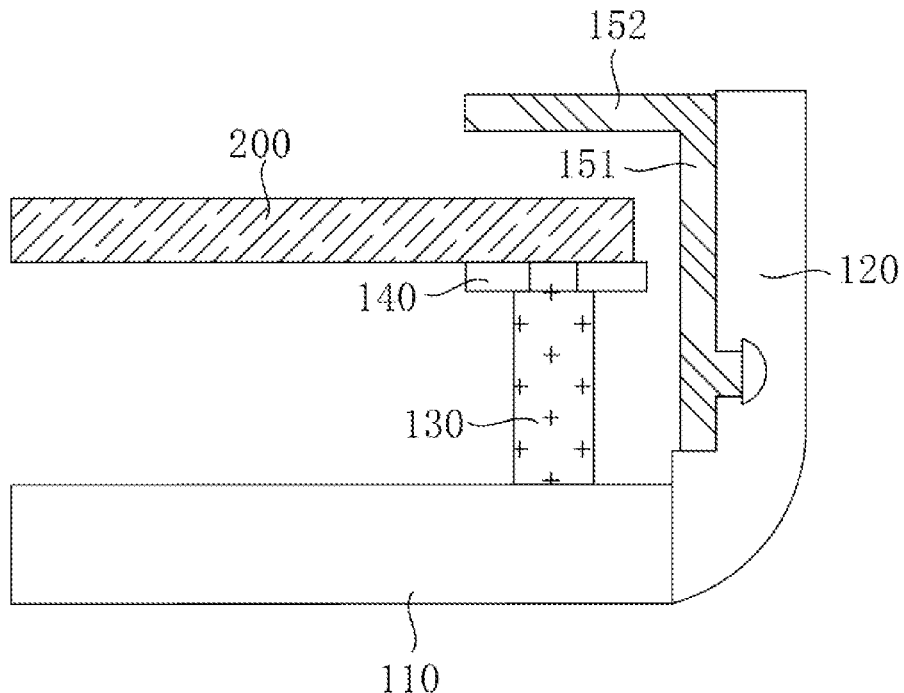
FIG. 7b is a schematic cross-sectional view of a backlight module after assembly of a securing bracket provided by an embodiment according to the present application.
Figure 8:
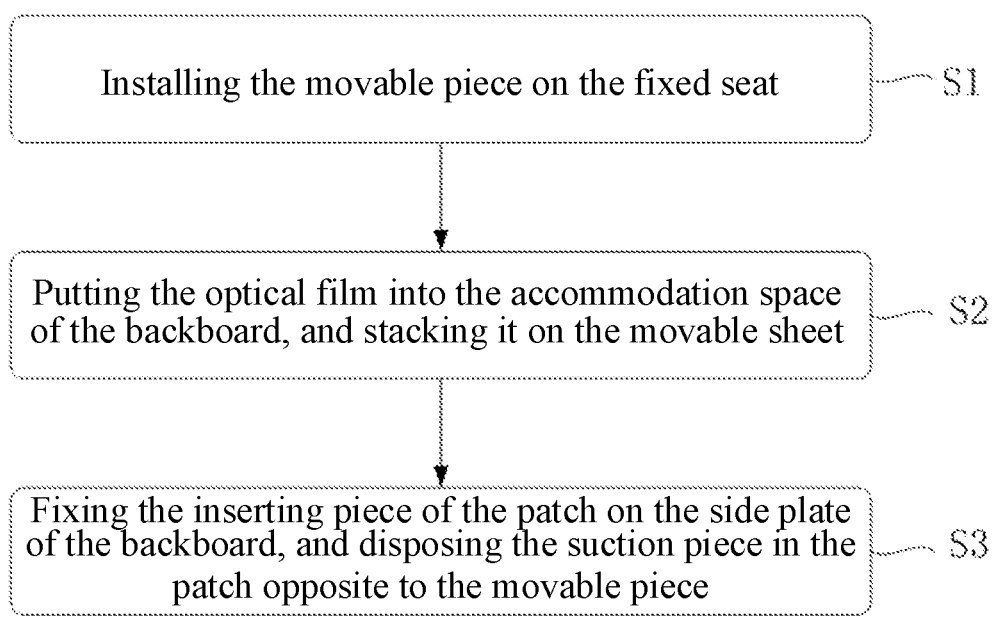
FIG. 8 is a flowchart of a method of assembling a backlight module provided by another embodiment according to the present application.

As shown in FIG. 7a, FIG. 7b and FIG. 8, as another embodiment according to the present application, the present application further discloses a backlight module assembly method for assembling the above-mentioned backlight module. The assembly method comprises the following operations:

S1: mounting the movable piece on the fixing seat;
S2: placing the optical film into the receiving space of the backboard, and stacking it on the movable piece;
S3: fixing the inserting piece of the securing bracket to the side plate of the backboard, and disposing the attraction piece in the securing bracket opposite to the movable piece;
when the insert piece is fixed onto the side plate, the attraction piece attracts the movable piece and the optical film, and cooperates with the movable piece to clamp and secure the optical film.

In the embodiment according to the present application, the optical film 200 is clamped and secured by the magnetic force between the securing bracket 150 and the movable piece 140, and after the securing bracket 150 is installed and fixed to the side plate 120, the optical film 200 is attracted and fixed upward by the movable piece 140, so that the optical film 200 is only pushed upward by the movable piece 140, but will not be pressed tightly, so that when the optical film 200 is heated and expanded, the optical film 200 can push the movable piece 140 away downwards, without concentrating the force on the middle region of the optical film 200 causing the optical film 200 to warp and affecting the optical quality. When the optical film 200 is cooled and shrinks, the movable piece 140 can move upward along with the retraction of the optical film 200, and continue to abut against the optical film 200, so that the optical film 200 will not be loosened, thereby effectively ensuring the quality of the product.

During the assembly process of the backlight module 20, the corresponding movable piece 140, optical film 200 and securing bracket 150 can be directly placed into the backboard 100 through a mechanical arm, without needing manual auxiliary fixing, so it is beneficial to improve the automation and the production efficiency.

Figure 9:
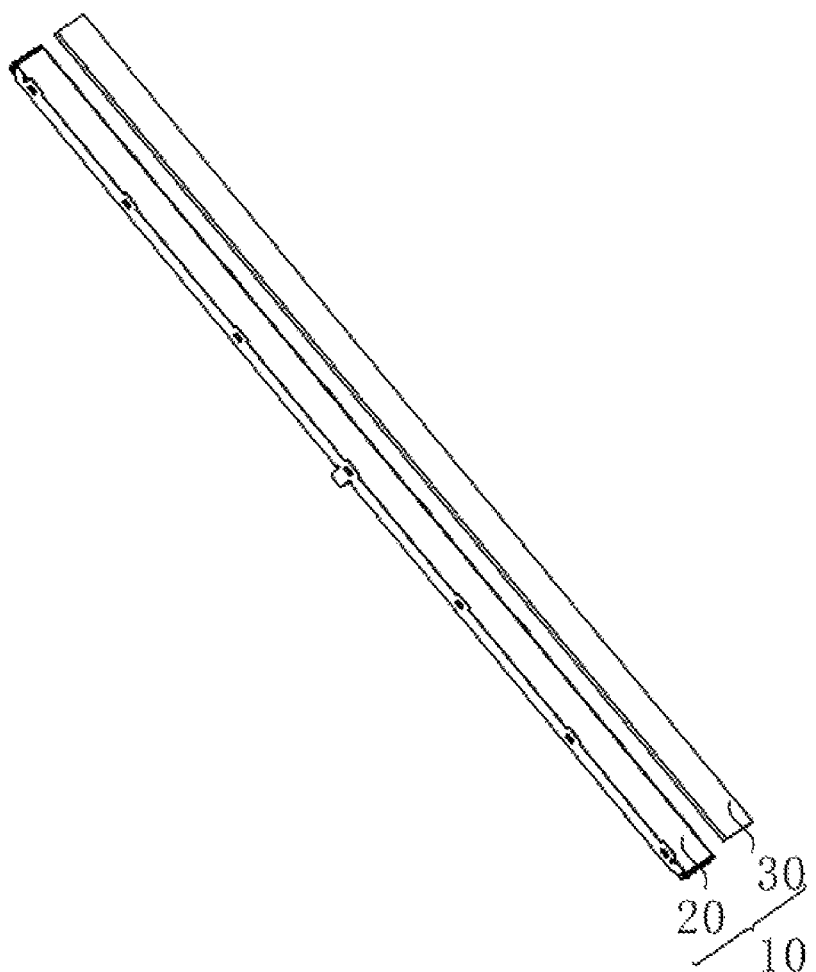
FIG. 9 is a schematic diagram of a display device provided by another embodiment according to the present application.

As shown in FIG. 9, the present application further discloses a display device 10. The display device 10 includes a display panel 30 and the backlight module 20 in the above-mentioned embodiments. The display panel 30 may be a TN (Twisted Nematic) display panel, an IPS (In-Plane Switching) display panel, a VA (Vertical Alignment) display panel, or an MVA (Multi-Domain Vertical Alignment) display panel, which is not limited here.

It should be noted that the limitations of various operations involved in this solution will not be deemed to limit the order of the operations, provided that they do not affect the implementation of the specific solution, so that the operations written earlier may be executed earlier or they may also be executed later or even at the same time. As long as the solution can be implemented, they should all be regarded as falling in the scope of protection of this application.

In addition, the inventive concept of the present application can be formed into many embodiments, but the length of the application document is limited and so these embodiments cannot be enumerated one by one. The technical features can be arbitrarily combined to form a new embodiment, and the original technical effect may be enhanced after the various embodiments or technical features are combined.

The foregoing description is merely a further detailed description of the present application made with reference to some specific illustrative embodiments, and the specific implementations of the present application will not be construed to be limited to these illustrative embodiments. For those having ordinary skill in the technical field to which this application pertains, numerous simple deductions or substitutions may be made without departing from the concept of this application, which shall all be regarded as falling in the scope of protection of this application.

What is claimed is:

1. A backlight module, comprising:
a backboard, comprising a bottom plate and a side plate, wherein the side plate is connected to an edge of the bottom plate and jointly defines a receiving space with the bottom plate;
a fixing seat, arranged in the receiving space and fixed to the bottom plate;
a movable piece, made of a metal material, and disposed opposite to the bottom plate and correspondingly disposed on the fixing seat;
a securing bracket, comprising an insert piece and an attraction piece that are connected together, wherein the insert piece is fixed to the side plate, and the attraction piece is arranged opposite to the movable piece and is made of a magnetic material; and
an optical film, arranged in the receiving space and between the movable piece and the attraction piece, wherein the movable piece and the attraction piece are each arranged corresponding to an edge of the optical film;
wherein when the securing bracket is not mounted on the side plate, the movable piece is disposed on the fixing seat, and the optical film is stacked on the movable piece; and wherein when the securing bracket is mounted on the side plate, the attraction piece is operative to attract the movable piece and cooperate with the movable piece to clamp and secure the optical film.

2. The backlight module as recited in claim 1, wherein the fixing seat comprises a fixing column fixed to the bottom plate;
wherein a pin is disposed at one end of the fixing column facing away from the bottom plate, and wherein a cross-sectional area of the pin is less than that of the fixing column;
wherein the movable piece defines a through hole, and the movable piece is slidably connected with the pin through the through hole.

3. The backlight module as recited in claim 1, wherein the fixing seat is block-shaped, and a side of the fixing seat facing the optical film defines a mounting groove, and wherein the movable piece is slidably fitted with the mounting groove and is operative to slide up and down along a depth of the mounting groove.

4. The backlight module as recited in claim 1, wherein the fixing seat comprises a telescopic rod operative to extend and retract in a direction perpendicular to the bottom plate, wherein one end of the telescopic rod is fixed to the bottom plate, and another end of the telescopic rod is fixedly connected to the movable piece;
wherein when the securing bracket is not installed on the side plate, the telescopic rod is in a retracted state; and when the securing bracket is installed on the side plate, the telescopic rod is in an extended state.

5. The backlight module as recited in claim 1, wherein the side plate defines a limiting groove opposite to the fixing seat, a shape of the limiting groove is congruent with a shape of the insert piece, and wherein a screw hole is defined in the limiting groove; wherein an expansion screw corresponding to the screw hole is arranged on a side of the insert piece away from the fixing seat, and wherein when the insert piece is inserted into the limiting groove, the expansion screw is fixedly fitted with the screw hole;
alternately, a slideway opposite to the fixing seat is defined in the side plate, wherein a horizontal section of the slideway is C-shaped, and the insert piece is inserted into the slideway to be fixedly connected with the side plate.

6. The backlight module as recited in claim 1, wherein at least two sides of the backboard are each provided with at least two of the fixing seats, at least two of the movable pieces, and at least two of the securing bracket; wherein the at least two fixing seats, at least two movable pieces, and at least two securing brackets are arranged in one-to-one correspondence.

7. The backlight module as recited in claim 1, wherein a side of the optical film comprises a hanging lug protruding outward in a horizontal direction, and wherein an orthographic projection of the hanging lug on the bottom plate overlaps or coincides with an orthographic projection of the movable piece on the bottom plate.

8. The backlight module as recited claim 1, wherein the movable piece and the attraction piece are each grid-shaped.

9. A method for assembling a backlight module, wherein the backlight module comprises:
a backboard, comprising a bottom plate and a side plate, wherein the side plate is connected to an edge of the bottom plate and jointly defines a receiving space with the bottom plate,
a fixing seat, arranged in the receiving space and fixed to the bottom plate;
a movable piece, made of a metal material, and disposed opposite to the bottom plate and correspondingly disposed on the fixing seat;
a securing bracket, comprising an insert piece and an attraction piece that are connected together, wherein the insert piece is fixed to the side plate, and wherein the attraction piece is arranged opposite to the movable piece and is made of a magnetic material; and
an optical film, arranged in the receiving space and between the movable piece and the attraction piece, wherein the movable piece and the attraction piece are each arranged corresponding to an edge of the optical film;
wherein when the securing bracket is not mounted on the side plate, the movable piece is arranged on the fixing seat, and the optical film is stacked on the movable piece; and wherein when the securing bracket is mounted on the side plate, the attraction piece is operative to attract the movable piece and cooperate with the movable piece to clamp and secure the optical film;
wherein the assembly method comprises:
mounting the movable piece on the fixing seat;
placing the optical film into the receiving space of the backboard, and stacking the optical film on the movable piece; and
fixing the inserting piece of the securing bracket to the side plate of the backboard, and disposing the attraction piece of the securing bracket opposite to the movable piece;
wherein the insert piece is fixed to the side plate, and wherein the attraction piece is operative to attract the movable piece and the optical film and cooperate with the movable piece to clamp and secure the optical film.

10. A display device, comprising a display panel and a backlight module configured to provide backlight for the display panel, the backlight module comprising:
a backboard, comprising a bottom plate and a side plate, wherein the side plate is connected to an edge of the bottom plate and jointly defines a receiving space with the bottom plate;

a fixing seat, arranged in the receiving space and fixed to the bottom plate;

a movable piece, made of a metal material, and disposed opposite to the bottom plate and correspondingly disposed on the fixing seat;

a securing bracket, comprising an insert piece and an attraction piece that are connected together, wherein the insert piece is fixed to the side plate, and wherein the attraction piece is arranged opposite to the movable piece and is made of a magnetic material; and an optical film, arranged in the receiving space and between the movable piece and the attraction piece, wherein the movable piece and the attraction piece are each arranged corresponding to an edge of the optical film;

wherein when the securing bracket is not mounted on the side plate, the movable piece is arranged on the fixing seat, and the optical film is stacked on the movable piece; and wherein when the securing bracket is mounted on the side plate, the attraction piece is operative to attract the movable piece and cooperate with the movable piece to clamp and secure the optical film.

11. The backlight module as recited in claim 1, wherein a slideway opposite to the fixing seat is defined in the side plate, wherein a horizontal section of the slideway is C-shaped, and the insert piece is inserted into the slideway to be fixedly connected with the side plate.

12. The backlight module as recited in claim 2, wherein a height of the pin is less than a thickness of the movable piece.

13. The backlight module as recited in claim 2, wherein at least two through holes are defined in the movable piece, and the fixing seat comprises at least two fixing columns, and wherein the pins on the fixing columns are in one-to-one correspondence with the at least two through holes.

14. The backlight module as recited in claim 3, wherein a length of the mounting groove is equal to a length of the fixing seat.

15. The backlight module as recited in claim 1, wherein the fixing seat is integrally formed with the backboard.

16. The backlight module as recited in claim 1, wherein the insert piece is made of a metal material or plastic.

17. The backlight module as recited in claim 1, wherein the securing bracket is integrally formed, and the attraction piece is formed by magnetically processing a top portion of the securing bracket.

18. The backlight module as recited in claim 1, wherein the backlight module adopts a direct-lit backlight, wherein the backlight module further comprises a light source assembly and a diffusion plate that are arranged in the receiving space, and wherein the optical film and the diffusion plate are sequentially stacked on the light source assembly;

wherein an edge of the optical film protrudes from the diffusion plate.

19. The backlight module as recited in claim 1, wherein the backlight module adopts an edge-lit backlight, wherein the backlight module further comprises a light source assembly and a light guide plate arranged side by side with the light source assembly, wherein both the light source assembly and the light guide plate are disposed in the receiving space, and wherein the optical film is arranged on the light guide plate;

wherein an edge of the optical film protrudes from the light guide plate.

* * * * *

UNITED STATES PATENT AND TRADEMARK OFFICE
CERTIFICATE OF CORRECTION

| | | |
|---|---|---|
| PATENT NO. | : 11,796,862 B1 | Page 1 of 1 |
| APPLICATION NO. | : 18/207683 | |
| DATED | : October 24, 2023 | |
| INVENTOR(S) | : Qinglin Chen | |

It is certified that error appears in the above-identified patent and that said Letters Patent is hereby corrected as shown below:

On the Title Page

Column 1, item (30) Foreign Application Priority Data field, insert --September 29, 2022 (CN) 202211198211--.

Signed and Sealed this
Nineteenth Day of November, 2024

Katherine Kelly Vidal
*Director of the United States Patent and Trademark Office*